United States Patent [19]

Kusase et al.

[11] Patent Number: 5,793,144
[45] Date of Patent: Aug. 11, 1998

[54] ROTOR FOR A ROTATING ELECTRIC MACHINE

[75] Inventors: Shin Kusase, Obu; Atsushi Umeda, Anjo; Saburo Hukaya, Kariya; Noriyasu Inomata, Toyota; Hitoshi Irie, Nagoya; Hiroshi Ishida, Anjo, all of Japan

[73] Assignee: Nippondenso Co., Ltd., Kariya, Japan

[21] Appl. No.: 928,525

[22] Filed: Sep. 12, 1997

Related U.S. Application Data

[60] Continuation-in-part of Ser. No. 571,217, Dec. 12, 1995, abandoned, which is a division of Ser. No. 297,838, Aug. 30, 1994, Pat. No. 5,483,116.

[30] Foreign Application Priority Data

| Aug. 30, 1993 | [JP] | Japan | P-5214253 |
| Jul. 5, 1994 | [JP] | Japan | P-6153679 |
| Jan. 16, 1997 | [JP] | Japan | 9-005227 |

[51] Int. Cl.⁶ ........................... H02K 1/22
[52] U.S. Cl. ............ 310/263; 310/156; 310/258
[58] Field of Search ............... 310/156, 263, 310/268

[56] References Cited

U.S. PATENT DOCUMENTS

| Re. 31,950 | 7/1985 | Binns | 310/156 |
| 4,959,577 | 9/1990 | Radomski | 310/213 |
| 5,038,066 | 8/1991 | Pawlak et al. | 310/263 |
| 5,132,581 | 7/1992 | Kusase | 310/263 |
| 5,177,391 | 1/1993 | Kusase | 310/263 |
| 5,306,977 | 4/1994 | Hayashi | 310/213 |

FOREIGN PATENT DOCUMENTS

| 394528 | 10/1990 | European Pat. Off. | 310/263 |
| 3-265450 | 11/1991 | Japan | 310/263 |
| 4-165950 | 6/1992 | Japan | 310/263 |

*Primary Examiner*—Steven L. Stephan
*Assistant Examiner*—Elvin Enad
*Attorney, Agent, or Firm*—Cushman Darby & Cushman IP Group of Pillsbury Madison & Sutro

[57] ABSTRACT

The present invention prevents the degradation of the power generating efficiency of an alternating current generator by preventing the expansion of an air gap formed between pole cores and a stator core, achieves low-noise operation by preventing generation of high-frequency impact magnetic noise, and makes it possible to relieve strains applied on a magnet holder. The present invention utilizes sixteen magnets, each of which fits between two of sixteen claw-like magnetic poles formed on the outer periphery of Lundell-type pole cores, which rotates integrally with a shaft. The magnets are caught and stopped by a magnet holder which has been formed by interconnecting zig-zagging segments and has elasticity as a whole. Here, the permanent magnets are held by the magnet holder so that the magnet holder does not protrude towards the rotor side from the outer peripheral face of the Lundell-type pole cores and the contacting faces of the magnet holder contact the outer faces of the permanent magnets. The claw-like magnetic poles are disposed so as to face the stator.

23 Claims, 6 Drawing Sheets

ROTOR FOR A ROTATING ELECTRIC MACHINE

This is a continuation-in-part of application Ser. No. 08/571,217, filed on Dec. 12, 1995, which was abandoned upon the filing hereof and which was a division of application Ser. No. 08/297,838 filed Aug. 30, 1994, now U.S. Pat. No. 5,483,116 issued Jan. 9, 1996.

BACKGROUND OF THE INVENTION

1. Field of the Invention

The present invention generally relates to a rotor for a rotating electric machine, such as alternating current (a.c.) generators and electric motors. More particularly, the present invention relates to rotary electric machines, which are adapted to hold permanent magnets with a resin-made magnet holding member, where the permanent magnets are disposed between circumferential side faces of two adjacent claw-like magnetic poles of Lundell-type pole cores, for instance.

2. Related Art

In a conventional rotor for an a.c. generator, for example, it is known that each permanent magnet in the generator is inserted between the circumferential side faces of two adjacent claw-like magnetic poles of Lundell-type pole cores to diminish the magnetic flux leakage between a plurality of claw-like magnetic poles. At the same time, the magnetic flux of the permanent magnets is directed towards the field coil (field winding) to improve the output efficiency, i.e., the electric power generating efficiency of the stator coil (armature winding) against the magnetomotive force of the field coil.

When Lundell-type pole cores rotate, strains are generated on the permanent magnets in the direction of the centrifugal force. Therefore, conventional devices require an arrangement where the permanent magnets do not protrude from the area between the circumferential side faces of two adjacent claw-like magnetic poles.

Such a technique is disclosed in, for example, Japanese Unexamined Patent Publication No. 4-165950. This document teaches that the outer face of a rotor, i.e., the outer peripheral face of a plurality of claw-like magnetic poles of Lundell-type pole cores, and the outer faces of permanent magnets, are covered with a non-magnetic holding member made of a metal such as aluminum. Furthermore, another technique is disclosed in Japanese Unexamined Patent Publication No. 3-265450. This document discloses that a metal or resin-made non-magnetic ring is disposed between claw-like magnetic poles of Lundell-type pole cores so that the permanent magnets are held by the non-magnetic ring.

According to the technique disclosed in Japanese Unexamined Patent Publication No. 4-165950, which employs a construction where the outer peripheral face of a rotor is covered with a non-magnetic holding member, a problem exists in that the air gap expands between the outer peripheral faces of the Lundell-type pole cores and the internal peripheral face of the stator core. Thus, the output efficiency, i.e., the electric power generating efficiency of the stator coil, is degraded by the expanding air gap between the outer peripheral faces of the Lundell-type pole cores and the internal peripheral face of the stator core.

Furthermore, the metal-made non-magnetic holding member and the permanent magnets are mounted on the Lundell-type pole cores, which are subjected to the magnetomotive force produced by the field coil. Accordingly, another problem exists, in that high-frequency impact magnetic noise caused by metallic collision noise is made between the claw-like magnetic poles and the non-magnetic holding member due to the vibration conveyed from the Lundell-type pole cores when the Lundell-type pole cores are rotated by rotation of the shaft.

Furthermore, in the technique disclosed in Japanese Unexamined Patent Publication 3-265450, as the non-magnetic ring is formed to have a circular shape with a constant width, strains are generated which deform the non-magnetic ring radially inwardly when a difference in thermal expansion exists between the non-magnetic ring and the claw-like magnetic poles. The non-magnetic ring is often deformed or broken.

SUMMARY OF THE INVENTION

It is an object of the present invention to provide a rotor for a rotating electric machine which can prevent performance degradation by preventing an air gap from expanding.

It is also an object of the present invention to achieve low noise operation by preventing the generation of high-frequency impact magnetic noise.

It is another object of the present invention to provide a rotor of a rotating electric machine which can stably hold permanent magnets by absorbing and relieving strains applied to the magnet holding member and at the same time prevent the deformation and breakage of the magnet holding member.

In the present invention, pole cores having a plurality of claw-like magnetic poles formed on the outer periphery thereof are used. The pole cores are assembled so that the claw-like magnetic poles engage with each other and rotate integrally with a rotatable shaft. The present invention further includes a plurality of permanent magnets, each of which is disposed between two adjacent claw-like magnetic poles of the pole cores and magnetized in the direction so as to diminish the magnetic flux leakage between the claw-like magnet poles. Also, the present invention includes a resin-made holding member fit between the circumferential side faces of the two adjacent claw-like magnetic poles to hold the permanent magnets. The resin-made magnet holding member is formed in a ring shape that circuitously completes a 360° circle.

Furthermore, the present invention may be formed such that the resin-made magnet holding member has a plurality of encompassing parts for encompassing or covering and holding each of the permanent magnets. Further, connecting parts interconnect the encompassing parts. The permanent magnets may be buried in the resin-made magnet holding member.

In this arrangement, because the plurality of permanent magnets are buried in the resin-made magnet holding member, it is possible to prevent foreign matter from reaching the magnets, and the formation of cracks on the surfaces of the permanent magnets can be avoided. Moreover, even if cracks were to occur on the permanent magnets, it is possible to prevent the permanent magnets from flying off the rotary device since they are covered with resinous material. Furthermore, the thermal impact due to the severe cooling/heating cycles experienced by a rotating electric machine as well as small vibrations caused by rotation can be eliminated.

The present invention may also be formed so that the resin-made magnet holding member is molded with resin in such a manner that only part of the permanent magnet is buried therein. When a plurality of permanent magnets are buried in the molded resin, the permanent magnets can be held using the exposed parts, thus making the positioning of the magnets quite easy to accomplish.

Furthermore, where the resin-made magnet holding member is formed of resin magnetic material, the magnetic flux of the permanent magnets can be reinforced if the resin-made magnet holding member is magnetized in the same direction as the permanent magnets.

The present invention may also be formed so that the resin-made magnet holding member has board parts, which contact the inner faces of the permanent magnets, base parts for controlling the axial movement of the permanent magnets, and catching parts for controlling the radial movement of the permanent magnets. Also, the resin-made magnet holding member holds each of the permanent magnets in a state where the opposed faces facing the side faces of the claw-like magnetic poles are open and the side faces of the permanent magnets contact the side faces of the claw-like magnetic poles.

In this arrangement, the assembly of the permanent magnets to the resin-made magnet holding member can be easily performed. As the assembly is performed, the magnetic flux can be easily passed through the claw-like magnetic poles by having the permanent magnets contact the side faces of the claw-like magnetic poles.

The present invention may also include a plurality of claw-like magnetic poles that are provided with a flange or taper shaped catching parts for suppressing the centrifugal movement of the resin-made magnet holding member. The size of the catching parts is set so that the centrifugal force of the permanent magnets compresses the resin-made magnet holding member on the catching parts. The suppression of the permanent magnets and the resin-made holding member in the centrifugal direction can be performed with greater precision, and thus resistance to the centrifugal forces acting on the permanent magnets and holding member can be improved.

The rotating electric machine may be an alternating current generator. The rotor may have Lundell-type pole cores, which allow the resin-made magnet holding member holding the permanent magnets to intervene suitably, and the power generating efficiency can be improved by the permanent magnets.

The resin-made magnet holding member does not have to have both ends thereof interconnected even though it is formed in a circular manner, thus allowing for size differences between the permanent magnets and the resin-made magnet holding member to be easily absorbed. That is, the resin-made holding member may be formed to have a discontinuity therein.

It is also possible for the present invention to include pole cores having a plurality of claw-like magnetic poles formed on the outer periphery thereof, which are assembled so that the claw-like magnetic poles engage with each other and rotate integrally with a rotatable shaft. The present invention may also have a plurality of permanent magnets each of which is disposed between two adjacent claw-like magnetic poles of the pole cores and magnetized in the direction that diminishes the magnetic flux leakage between the claw-like magnet poles. Further, a resin-made holding member may be fit between side faces of the two adjacent claw-like magnetic poles to hold the permanent magnets. The resin-made magnet holding member is preferably formed so that it zig-zags in a complete circle, making repeated V-shaped turns.

According to the present invention, as a plurality of permanent magnets are held by a resin-made magnet holding member fit between the side faces of each of two adjacent claw-like magnet poles of Lundell-type pole cores, the gap between the outer peripheral face of the rotor and the inner peripheral face of the stator, i.e., the air gap, does not expand, whereby the degradation in the performance of the rotating electric machine is prevented. Moreover, by suppressing vibrations conveyed from the pole cores to the permanent magnets to prevent the interference between the magnet holding member and the permanent magnets, the generation of high-frequency impact magnetic noise is also suppressed. Furthermore, as the resin-made magnet holding member is formed in a zig-zag ring shape or in repeated V-shaped turns, the elastic deforming force is generated on the whole portion of the resin-made magnet holding member to absorb and relieve strains applied to the magnet holding member.

BRIEF DESCRIPTION OF THE DRAWINGS

Other objects, features and characteristics of the present invention along with methods of operation and the functions of interrelated parts will become apparent to a person skilled in the art to which the invention pertains from a study of the following detailed description, the appended claims, and the attached figures, all of which form a part of this specification. In the figures:

DETAILED DESCRIPTION OF THE PRESENTLY PREFERRED EXEMPLARY EMBODIMENTS

The rotor of a rotating electric machine according to the present invention will now be described with reference to the attached figures.

Figure 1:
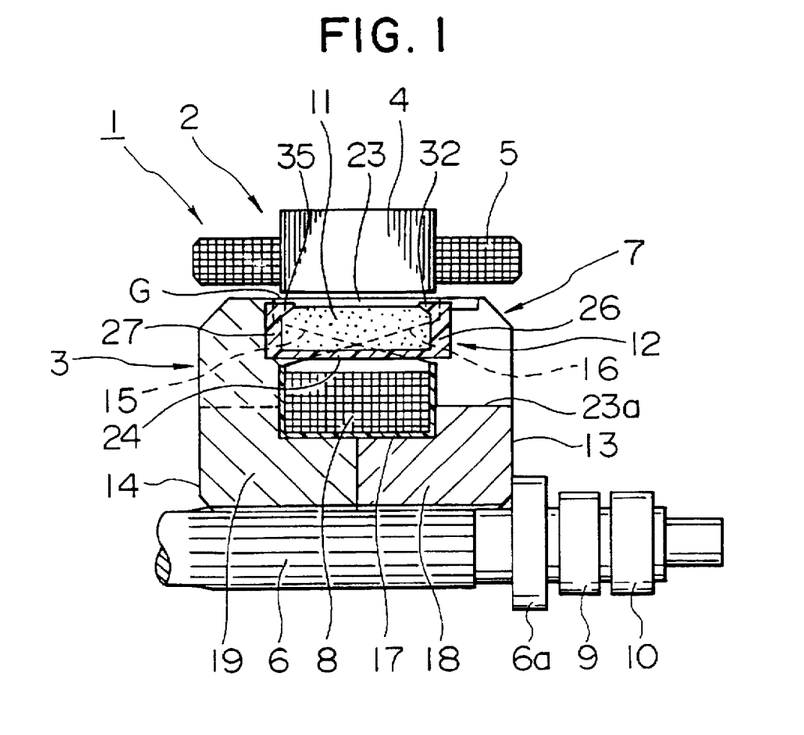
FIG. 1 is a sectional view of the main part of the alternating current generator for a vehicle according to a first embodiment of the present invention.
Figure 2:
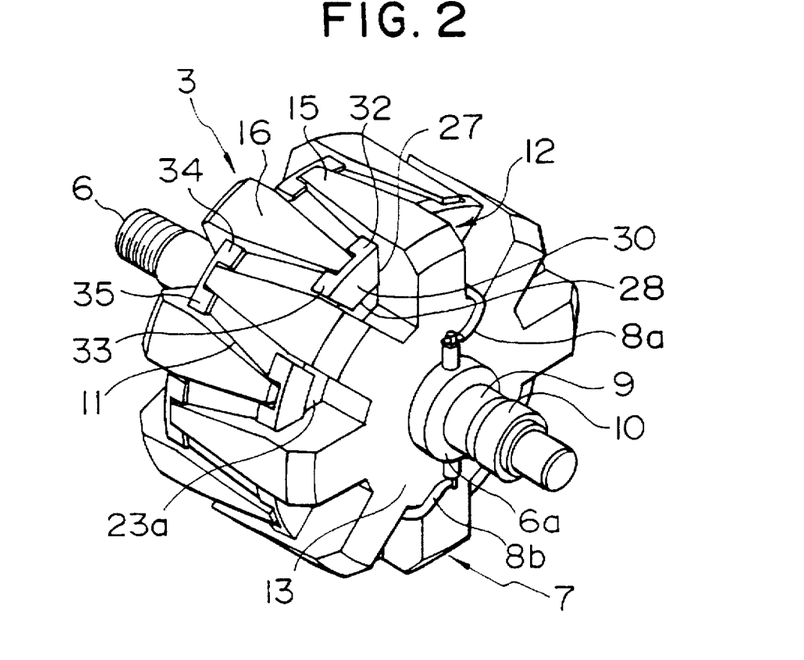
FIG. 2 is a perspective side view of the rotor of the alternating current generator illustrated in FIG. 1.
Figure 3:
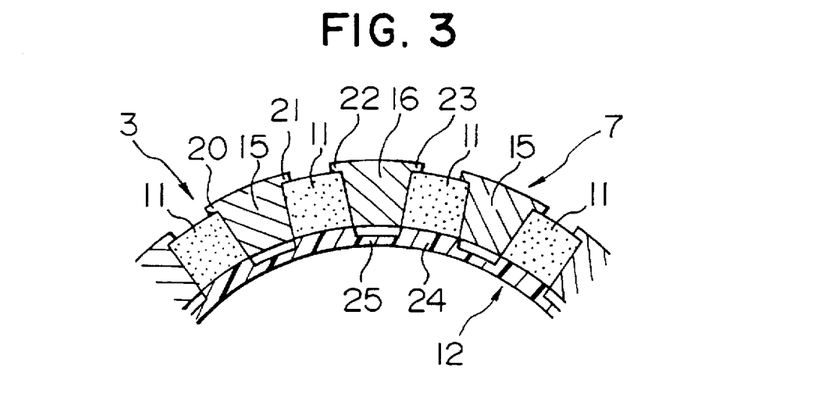
FIG. 3 is a sectional view of the main part of the rotor of the alternating current generator illustrated in FIG. 1.

FIGS. 1 through 5 illustrate the first embodiment of the present invention. FIG. 1 illustrates the main part of an alternating current generator for a vehicle, while FIGS. 2 and 3 illustrate a rotor of an alternating current generator, as a rotating electric machine.

Alternating current generator 1 mainly comprises stator 2, which serves as the armature, and a rotor 3 serving as the field. Stator 2 is composed of stator core 4 and stator coils 5, which are supported by a frame (not illustrated). Stator core 4 is formed of overlapping thin sheet steel. A multiplicity of slots (not illustrated) are provided on the internal peripheral face of stator core 4, and three pairs of stator coils 5 are inserted in the slots. Alternating voltage is generated on stator coils 5 when rotor 3 rotates.

Rotor 3 rotates integrally with shaft 6 and mainly comprises Lundell-type pole cores 7, field coil 8, slip rings 9 and 10, sixteen permanent magnets 11, and magnet holder 12. Shaft 6 is connected to a pulley (not illustrated) and is rotatably driven by an engine (not illustrated) mounted in a vehicle. Ring-shaped stopper 6a is integrally formed on shaft 6 to fix Lundell-type pole cores 7 to the outer periphery of shaft 6.

Lundell-type pole cores 7 comprise circular plate parts 13 and 14 assembled to shaft 6 and eight claw-like magnetic poles 15 and 16 extending from the outer peripheral side of circular plate parts 13 and 14 so that claw-like magnetic poles 15 and 16 engage with one another. It is noted that, in Lundell-type pole cores 7 when an electric current flows through field coil 8, all of claw-like magnetic poles 15 disposed on one axial side are magnetized to the south (S) pole while all of claw-like magnetic poles 16 disposed on the other axial side turn toward the north (N) pole. In the middle part of Lundell-type pole cores 7, wound parts 18 and 19 are formed on which field coil 8 is wound a plurality of times around resin-made bobbin 17.

In the circumferential direction of claw-like magnetic poles 15 and 16, flange parts 20 through 23 (depicted in FIG. 3) are formed in order to prevent permanent magnets 11 from protruding in the centrifugal direction. Flange parts 20 through 23 act as stopping parts and catch and prevent the outer peripheral faces of permanent magnets 11 from moving when rotor 3 turns.

The first end and last end of field coil 8 are connected to slip rings 9 and 10 via lead wires 8a and 8b. Here, field coil 8 has been impregnated with an epoxy base resin injected from trough 23a formed between the outer peripheral part of circular plate part 13 and the bottom part of claw-like magnetic pole 15. The impregnation is conducted to prevent the displacement of field coil 8 and also to prevent noise generation.

Slip rings 9 and 10 are mounted on one end of shaft 6 to supply an exciting current to rotating field coil 8. The device is designed so that on the periphery of slip rings 9 and 10, a brush (not illustrated) is provided that slides in order to supply an exciting current.

Figures 4, 5:
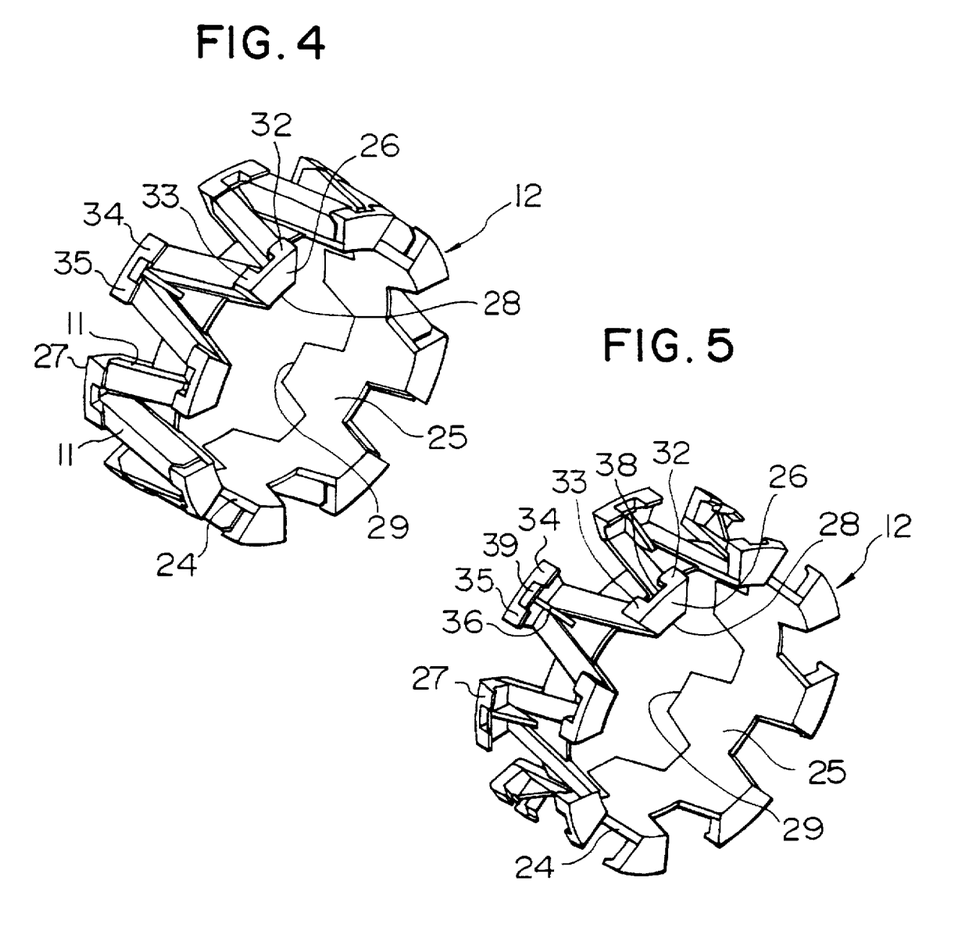
FIG. 4 is a perspective side view illustrating the state in which sixteen permanent magnets and a magnet holder are assembled.
FIG. 5 is a perspective side view of a magnet holder.

FIG. 4 illustrates the state where sixteen permanent magnets 11 are assembled with magnet holder 12. Each of the sixteen permanent magnets is disposed between the circumferential side faces of two adjacent claw-like magnetic poles 15 and 16 and magnetized in the direction that diminishes the magnetic flux leakage between the two adjacent claw-like magnetic poles 15 and 16. Ferrite magnets, resin magnets formed by sintering the powder of nylon, Nd, Fe and B, rare earth magnets, or the like, are used as permanent magnets 11.

Both side faces of each permanent magnet 11 contact the side faces of two adjacent claw-like magnetic poles 15 and 16, respectively. The inner face of each permanent magnet 11, which faces shaft 6, and both axial end faces of each permanent magnet 11 are held by magnet holder 12, while the outer face of each permanent magnet 11 faces the inner peripheral face of stator 2 across an air gap G. The permanent magnet according to the first embodiment has a rectangular, box-like shape with a radial length of 10 mm, an axial length of 26 mm and a width of 8 mm.

FIG. 5 illustrates magnet holder 12. Magnet holder 12 is a resin-made holding member and is singly molded in one piece using non-magnetic resin material, such as polybutylene-terephthalate resin (PBT resin) and nylon 66 which contains 40% glass fibers.

Magnet holder 12 has sixteen board parts 24 extending generally axially, each of which holds one of permanent magnets 11 in the state that the end faces of each permanent magnet 11 contact two adjacent claw-like magnetic poles 15 and 16. Connecting parts 25 interconnect boards 24. Connecting parts 25 extending generally circumferentially are disposed so as to relieve strains by providing the entire magnet holder 12 with anti-expansion rigidity while ensuring some degree of elasticity and at the same time facilitating assembly. Here, the inner peripheral faces of connecting parts 25 are formed so as to have a generally circular shape.

Sixteen board parts 24, each of which is fit between the side faces of two adjacent claw-like magnetic poles 15 and 16, are formed to have a zig-zag ring shape, which zig-zags back and forth between poles 15 and 16 with repeated V-shaped turns formed at base parts 26 and 27 (described below). On the upper end face (the face on the side opposite shaft 6) of each of board parts 24, permanent magnets 11 are individually placed so that the inner face of each permanent magnet 11 contacts the upper end face respectively.

A pair of base parts 26 and 27 extend radially outward towards stator 2 and are formed from return point parts 28 and 29 of board parts 24. That is, the base parts 26 and 27 extend radially from both axial ends of board parts 24. Here, the inner peripheral faces of the board parts 24 are formed to have a slightly circular arcuate shape.

Permanent magnets 11 are fit between base parts 26 and 27 so that the outer face and both side faces of each permanent magnet 11 are exposed. A pair of base parts 26 and 27 contact opposite end faces of each permanent magnet 11 so as to suppress the axial movement of each permanent magnet 11. Base parts 26 and 27 include catching parts 32 through 35 extending axially, which suppress the axial movement of each permanent magnet 11.

Two adjacent board parts 24 meet one another in generally a V-shape at base parts 26 and 27. Triangular partition boards 36 protrude axially from connecting parts 25, and thus maintain a separation between board parts 24. Catching parts 32 and 33 of each base part 26 extend in a generally V-shape so that the outer end of base part 26 contacts the outer end face of permanent magnet 11. Rectangular slit 38 at which the claw-like end of each magnetic pole is disposed is provided between catching parts 32 and 33 so as to make it possible to disassemble magnets 11 from the tip of claw-like magnet pole 16 without consuming a great deal of time or effort.

Catching parts 34 and 35 of each base part 27 extend in a generally V-shape so that the outer end of base part 27 contacts the outer end face of permanent magnet 11. That is, catching parts 34 and 35 face catching parts 32 and 33. Rectangular slit 39 is provided between catching parts 34 and 35 so as to make it possible to disassemble magnets 11 from the tip of claw-like magnet pole 15.

The inner peripheral faces of catching parts 32 through 35 are formed so as to be thinner proximate the tip thereof, and the outer peripheral faces of catching parts 32 through 35 are formed so that they have a generally circular arcuate shape.

The method of assembling rotor 3 according to the first embodiment will be described with reference to FIGS. 1 through 5.

First, resin-made magnet holder 12, shown in FIG. 5, is formed by means of undercutting using an one-way cutting molding die (not illustrated). Each of permanent magnets 11 is then fit between each pair of base parts 26 and 27 of magnet holder 12 to form an assembly such as the one pictured in FIG. 4.

By firmly fitting each of permanent magnets 11 between catching parts 32 through 35, as illustrated in FIG. 4, permanent magnets 11 and magnet holder 12 are assembled. This manner of assembly allows permanent magnets 11 and magnet holder 12 to be put easily together in a short period of time.

Field coil 8 is then wound a plurality of times on the outer periphery of resin-made bobbin 17. Then, circular plate 13, disposed on one side, field coil 8, permanent magnets 11 on the magnet holder 12, and circular plate 14 on the other side of plate 13 are assembled. At this time, as illustrated in FIGS. 2 and 3, the device is structured so that each of permanent magnets 11 is disposed between claw-like magnetic poles 15 and 16. Permanent magnets 11 are caught by flange parts 20 through 23 of the claw-like magnetic poles 15 and 16. Then, after shaft 6 is inserted in the core, slip rings 9 and 10 are mounted on the outer periphery of shaft 6 for manufacturing rotor 3.

Here, as illustrated in FIGS. 1 and 2, the outer diameter of the outer peripheral face of catching parts 32 through 35 of magnet holder 12 is larger than the outer diameter of the outer peripheral face of permanent magnets 11. Furthermore, the outer diameter of the outer peripheral faces of claw-like magnetic poles 15 and 16 is larger than the outer diameter of the outer peripheral face of catching parts 32 through 35 of magnet holder 12. That is, as permanent magnets 11 and magnet holder 12 do not protrude from the outer peripheral face of Lundell-type pole cores 7, the expansion of air gap G formed between the outer peripheral face of Lundell-type pole cores 7 and the inner peripheral face of stator core 4 can be prevented.

Operation of an alternating current generator for a vehicle according to the first embodiment will be described with reference to FIGS. 1 through 5.

When shaft 6 is rotatably driven by the engine, rotor 3 rotates integrally with shaft 6. Accordingly, permanent magnets 11, each disposed within magnet holder 12 circumferentially between adjacent claw-like magnetic pole 15 on one side of each of permanent magnets 11 and claw-like magnetic pole 16 on the other side, also rotate. Hence, strains are applied on permanent magnets 11 in the direction of the centrifugal force, whereby forces are generated in the radial direction which can move permanent magnets 11.

As each of permanent magnets 11 are fit between a pair of base parts 26 and 27 of magnet holder 12, and as both ends of the outer face of each of the permanent magnets 11 are caught by catching parts 32 through 35, respectively, permanent magnets 11 are firmly held by magnet holder 12. The configuration, where permanent magnets 11 are firmly held by magnet holder 12 even when strains are applied to permanent magnets 11 in the direction of the centrifugal force, can prevent permanent magnets 11 from protruding from the area between the claw-like magnetic poles 15 and 16. Furthermore, as the magnet holder 12 is molded in one piece with resin, vibrations caused between the magnet holder 12 and the permanent magnets 11 can be successfully suppressed, while at the same time preventing high-frequency impact magnetic noise.

When an exciting current flows through field coil 8, a magnetomotive force is generated in the field coil 8. At this time, claw-like magnetic pole 15 on one axial side is magnetized to the south (S) pole, and claw-like magnetic pole 16 on the other side is magnetized to the north (N) pole. Then, due to the existence and location of permanent magnets 11, the magnetic flux leakage between claw-like magnetic pole 15 on one side and claw-like magnetic pole 16 on the other side is diminished, and alternating current voltage is generated at stator coils 5 by adding the magnetic flux generated by permanent magnets 11 themselves to the magnetic flux acting on stator core 4.

Moreover, as magnet holder 12 is formed to have a zig-zag circuitous ring shape, which completes 360°, it is possible to provide entire magnet holder 12 with anti-expansion rigidity while ensuring some degree of elasticity, whereby strains can be relieved and assembly is performed easily.

As described above, as alternating current generator 1 is designed to prevent permanent magnets 11 from protruding from the area between the side faces of claw-like magnetic poles 15 and 16, the magnetic flux leakage between adjacent claw-like magnetic pole 15 and claw-like magnetic pole 16 can be prevented. Furthermore, as permanent magnet 11 is held by magnet holder 12 so that both circumferential side faces of permanent magnet 11 directly contact the side faces of claw-like magnetic poles 15 and 16, the magnetic flux of permanent magnets 11 can be further improved.

Moreover, as magnet holder 12 is molded in a unitary piece from resin, collisions between permanent magnets 11 and magnet holder 12 caused by the vibration of Lundell-type pole cores 7 can be cushioned, thus successfully preventing the generation of high-frequency impact magnetic noise.

Furthermore, as magnet holder 12 is formed in a substantially circular zig-zag ring shape, it is possible to provide the entire magnet holder 12 with anti-expansion rigidity while ensuring some degree of elasticity. Thus, strains caused by a difference in thermal expansion can be relieved and assembly of the device can be performed easily.

In addition, as permanent magnets 11 and magnet holder 12 do not protrude from the outer diameter of Lundell-type pole cores 7, the expansion of air gap G formed between the outer peripheral face of Lundell-type pole cores 7 and the inner peripheral face of stator core 4 can be prevented. Accordingly, the output efficiency, i.e., the generating efficiency of stator coils 5, is improved against the magnetomotive force of field coil 8 of alternating current generator 1.

In this embodiment, an additional quantity of magnetic flux can be obtained, as compared to a rotor simply using twelve-pole pole cores and twelve permanent magnets, because the present embodiment uses rotor 3 having sixteen-pole Lundell-type pole cores 7 and sixteen permanent magnets 11. This is due to the fact that sixteen-pole Lundell-type pole cores 7 have a larger total sectional area of permanent magnets 11 than do the twelve-pole pole cores. Accordingly, even if the decrease in the magnetomotive force of field coil 8 is taken into account, the output efficiency, i.e., the generating efficiency of stator coil 5 is improved as compared to the conventional technique.

In addition, as rotor 3 is assembled so that permanent magnet 11 is held on both ends by magnet holder 12, the die control and the manufacturing control of the molding pressure, etc., can be simplified as compared to a technique for molding permanent magnets 11. The assembly of the permanent magnets 11 and magnet holder 12 into a single piece can be performed easily, thus reducing the manufacturing cost of rotor 3.

Figure 6:
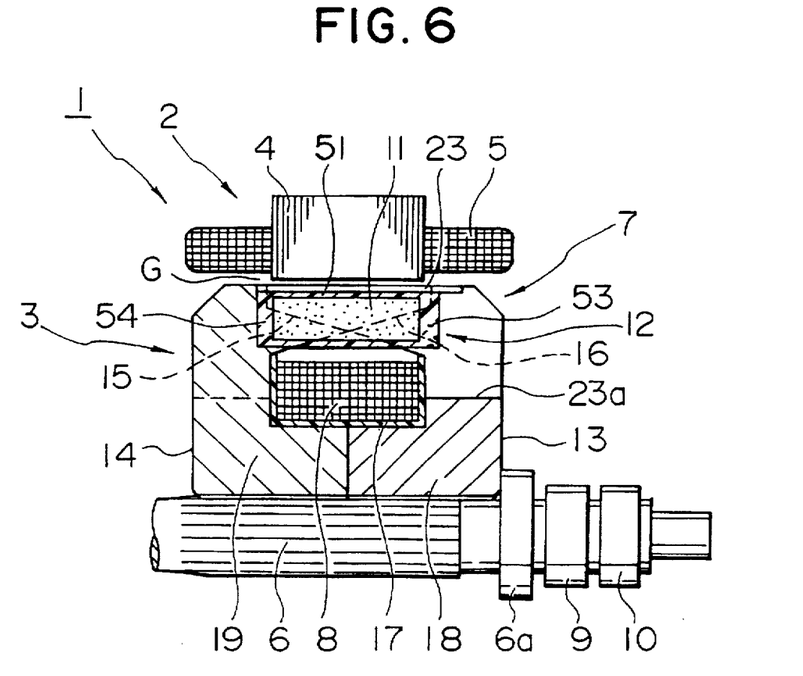
FIG. 6 is a sectional view of the main part of the alternating current generator for a vehicle employed according to a second embodiment of the present invention.
Figure 7:
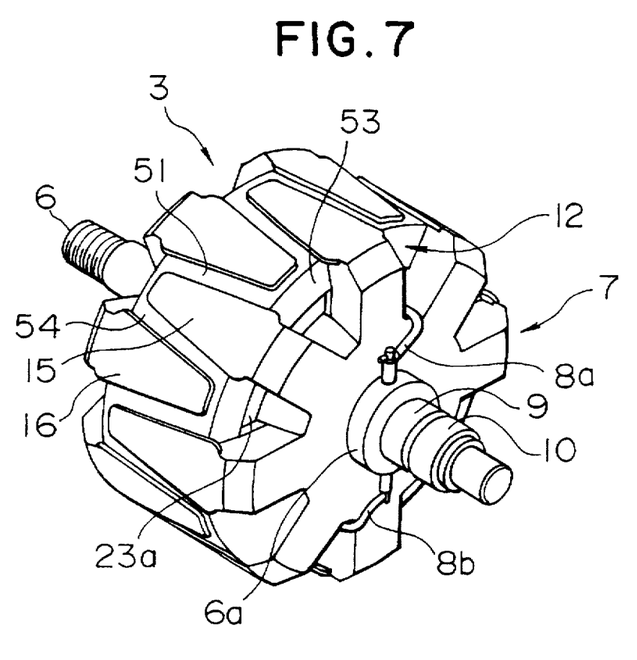
FIG. 7 is a perspective side view of the rotor of the alternating current generator illustrated in FIG. 6.
Figure 8:
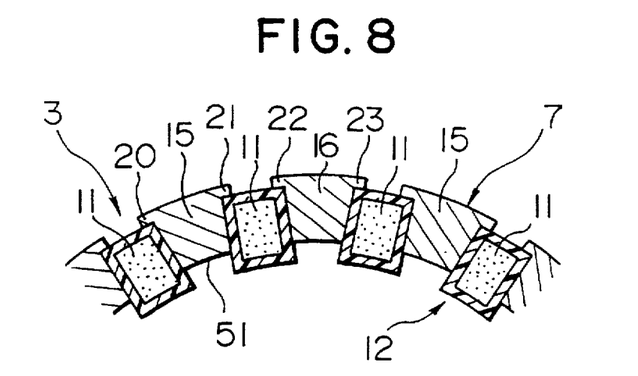
FIG. 8 is a sectional view of the main part of the rotor of the alternating current generator illustrated in FIG. 6.
Figures 9, 10:
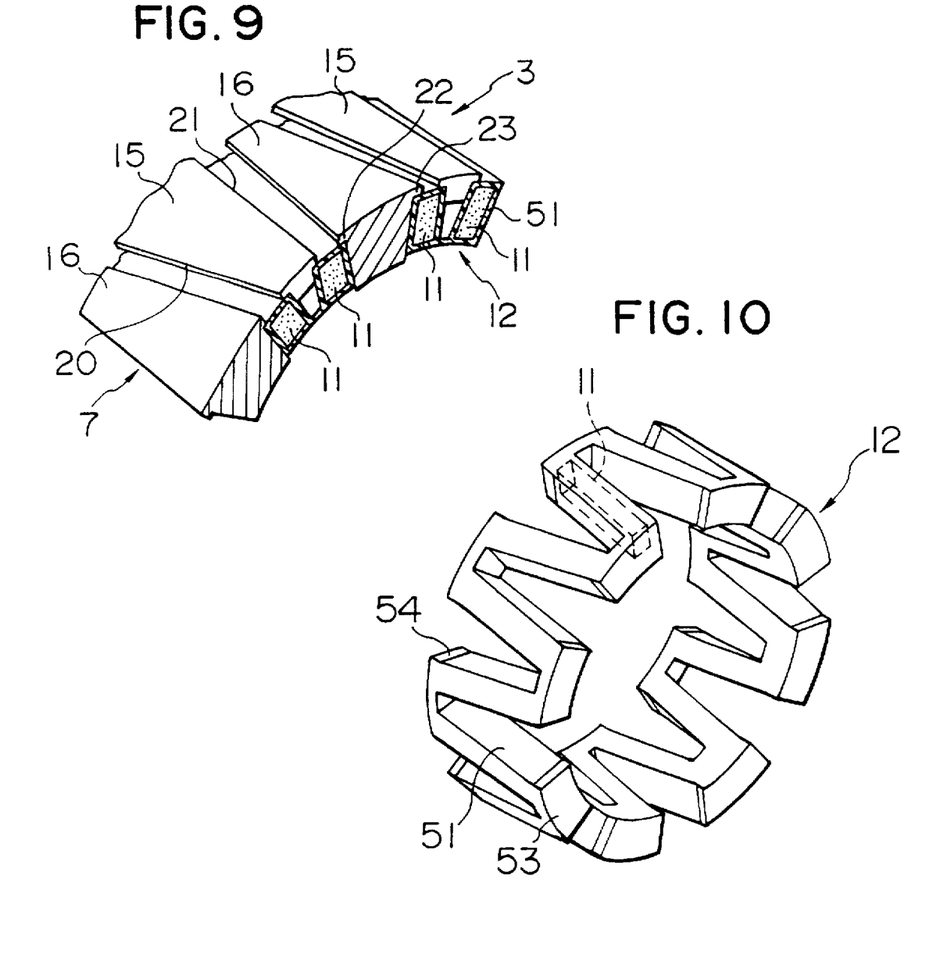
FIG. 9 is a perspective side view of the main part of the rotor of the alternating current generator illustrated in FIG. 8.
FIG. 10 is a perspective side view of a magnet holder with which sixteen permanent magnets are molded.

FIGS. 6 through 10 illustrate the second embodiment of the present invention. FIG. 6 illustrates the main part of an alternating current generator for a vehicle, and FIGS. 7 through 9 illustrate a rotor of a rotating electric machine of an alternating current generator for a vehicle. Similar parts to those described above with respect to the first embodiment are given the same reference numerals in FIGS. 6 through 10.

Rotor 3 of an alternating current generator according to the second embodiment mainly comprises Lundell-type pole cores 7, a field coil 8, two slip rings 9 and 10, sixteen permanent magnets 11, and magnet holder 12 and rotates integrally with shaft 6.

Magnet holder 12 of the second embodiment is illustrated in FIG. 10. Magnet holder 12 is molded integrally with sixteen permanent magnets 11 using resin material such as poly-butylene-terephthalate resin (PBT resin) and nylon 66 containing 40% glass fibers.

Magnet holder 12 has sixteen encompassing parts or covering 51 and connecting parts 53 and 54, which interconnect encompassing parts 51. The inner peripheral faces of connecting parts 53 and 54 are formed to have a generally arcuate shape.

Each of encompassing parts 51, which is formed as a square, elongated box-like shape so as to encompass each of permanent magnets 11 therein, contains each of permanent magnets 11 in the state where the opposed faces facing the side faces of two adjacent claw-like magnetic poles 15 and 16, the inner face, and the outer face of each permanent magnet 11 are covered with resin. Each of encompassing parts 51 fits between the side faces of two adjacent claw-like magnetic poles 15 and 16. Furthermore, encompassing parts 51 are formed so as to zig-zag back and forth axially and circumferentially between poles 15 and 16 and form a complete 360° band. Also, each of encompassing parts 51 suppresses the centrifugal movement of a respective permanent magnet 11.

On both axial ends of each of encompassing parts 51, connecting parts 53 and 54 are disposed. Connecting parts 53 and 54 interconnect each two of encompassing parts 51. Two adjacent encompassing parts 51 meet in a V-shape at each of connecting parts 53 and 54. Connecting parts 53 and 54 are thicker at the positions where encompassing parts 51 come together. Connecting parts 53 and 54 are independent elements and correspond to claw-like magnetic poles 15 and 16. The assembly tolerances between claw-like magnetic poles 15 and 16 and magnet holder 12 can be absorbed by modification of each of connecting parts 53 and 54.

In the circumferential direction of claw-like magnetic poles 15 and 16, flange parts 20 through 23 are formed to prevent magnet holder 12 having permanent magnets 11 buried therein from protruding in the centrifugal direction when rotor 3 rotates at high speeds. Flange parts 20 through 23 serve as the catching part and catch the outer faces of encompassing parts 51 of magnet holder 12.

This embodiment, in which the periphery of each of permanent magnets 11 is thoroughly encompassed with resin material, can successfully prevent foreign matter from reaching or entering into permanent magnets 11 and thus assist in preventing cracks from occurring on permanent magnets 11. Moreover, even if cracks occur on permanent magnets 11, it is possible to prevent permanent magnets from flying off as rotor 3 rotates at high speeds as permanent magnets 11 are totally covered by resin. Furthermore, because each of permanent magnets 11 is encompassed with resin, the present invention is able to relieve thermal impact caused by severe heating and cooling cycles. For example, the temperature can reach between 150° and 180° C. during generation of electrical power, but returns to ambient air temperature when the power generation process is stopped. Because permanent magnets 11 are covered with resin, they do not experience the extreme thermal impact to which they might otherwise be subjected. The vibrational impact caused by small vibrations of a vehicle also does not crack permanent magnets 11 due to the fact that the magnets are encompassed in resin.

In addition, forces which deform magnet holder 12 radially inward are generated by a difference in the thermal expansion between magnet holder 12 and claw-like magnetic poles 15 and 16. However, due to the shape in which magnet holder 12 is formed, such a deformative force can be absorbed with a spring effect. Here, the expansion of the claw-like magnetic poles in the radial direction caused by the centrifugal force exerted thereon during rotation can also be absorbed, thus preventing breakage of the magnet holder itself.

Moreover, as illustrated in FIGS. 8 and 9, encompassing parts 51 intervene between the side faces of permanent magnets 11 and claw-like magnetic poles 15 and 16. By selecting resin material with adequate permanent set (creep quantity), even if the magnet holder 12 contacts flange parts 20 through 23 at a single point, the resin material alters its shape with the creep of the resin material so that the magnet holder 12 contacts flange parts 20 through 23 in a substantially planar manner, and uniform strain is conveyed to permanent magnets 11 without any concentration or localization of strains, whereby breakage can be prevented.

Figure 11:
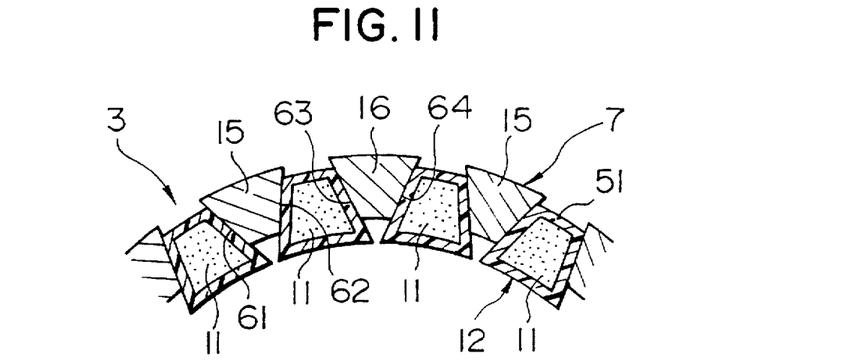
FIG. 11 is a sectional view of the main part of the rotor of the alternating current generator for a vehicle according to a third embodiment of the present invention.

FIG. 11 depicts the third embodiment of the present invention and illustrates a partial sectional view of a rotor for a rotating electric machine, such as an alternating current generator for a vehicle.

Taper parts 61 through 64 are formed on claw-like magnetic poles 15 and 16, each of which becomes smaller in width in the vicinity of the shaft core. By catching the outer peripheral face of each encompassing part 51 of magnet holder 12 molded integrally with permanent magnets 11, taper parts 61 through 64 prevent magnet holder 12 from protruding in the centrifugal direction when rotor 3 rotates at a high speed.

Figures 12, 13:
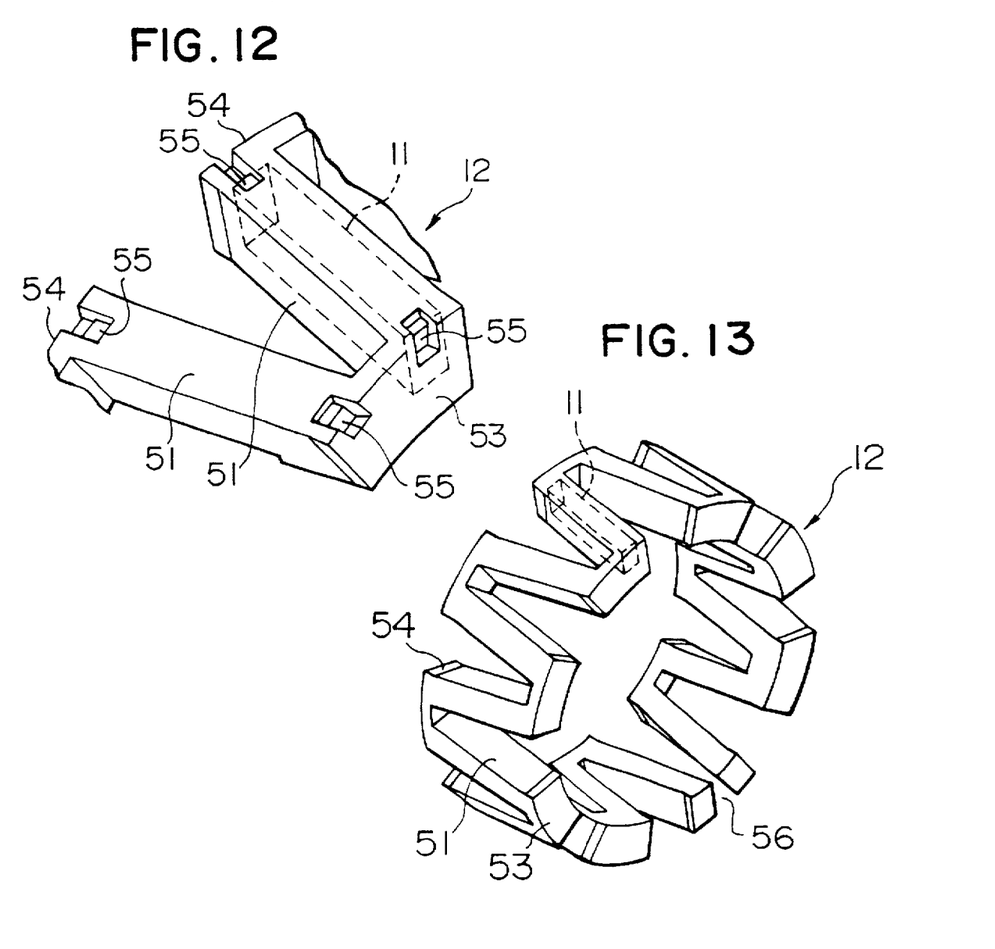
FIG. 12 is a magnified view of the main part of the magnet holder illustrating the modification where part of the permanent magnet is exposed.
FIG. 13 is a perspective side view illustrating the modification where a part of the magnet holder is formed so as to be discontinuous.

The second and third embodiments described above refer to the structure where permanent magnets 11 are completely covered with resin. On the other hand, as illustrated in FIG. 12, it is acceptable that exposed parts 55 of permanent magnet 11 be provided in resin-made magnet holder 12 and that a part of each permanent magnet 11 be exposed through resin-made magnet holder 12 for the purpose of easily burying and molding the permanent magnets 11 in the resin-made magnet holder 12. Exposed part 55 allows the positioning and fixing of permanent magnets 11 to be performed easily while burying and molding permanent magnets 11.

In addition, the magnetic flux can be further improved by making resin-made magnet holder 12 from a resin magnetic material and magnetizing resin-made magnet holder 12 in the same direction as permanent magnets 11 between the claw-like magnetic poles.

Furthermore, as illustrated in FIG. 13, it is acceptable to form resin-made holder 12 with a discontinuity 56 therein. It is also possible that the discontinuity be formed in connecting part 53, thus achieving the same effect.

Figure 14:
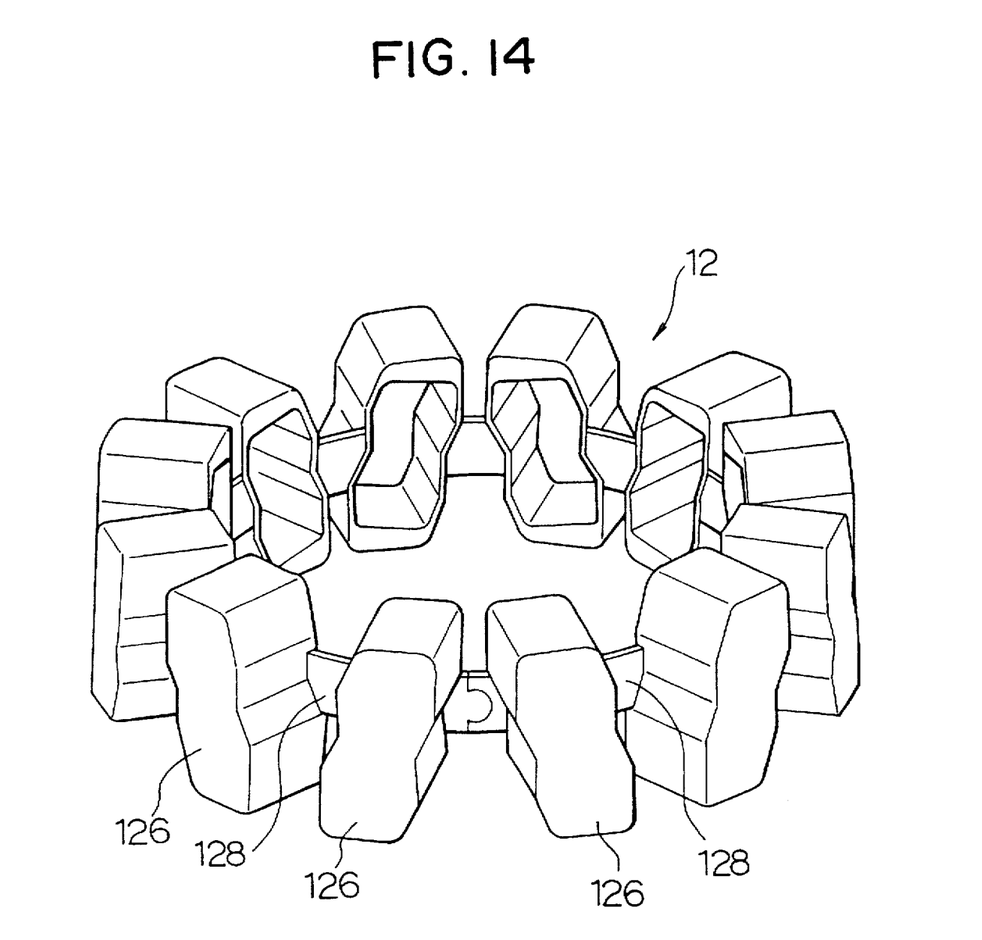
FIG. 14 is a perspective view of a magnet holder according to a fourth embodiment of the present invention.

In the fourth embodiment shown in FIG. 14, the magnet holder 12 primarily comprises a plurality of box-like encompassing or accommodating parts 126 and a connecting part 128 which are made integrally by a resin. Each accommodating part 126 has a closed wall on the radially outside and an opening through which the permanent magnet 11 is inserted from the radially inside while flexing concave-convex side walls. The connecting part 128 has a width (axial length) shorter than the axial length of the accommodating part and connects circumferentially in a ring shape adjacent two of the accommodating parts 126 at only generally the axial centers of the accommodating parts 126. Thus, the magnet holder 12 is made to flex to a degree necessary for fitting between the pole claws 16 and 17.

In each of the above-mentioned embodiments, the present invention is applied to rotor 3 of the alternating current generator 1 intended for vehicular use. The present invention is equally applicable to other types of rotary devices. In addition, Lundell-type pole cores 7 are used as pole cores in the disclosed embodiments, but St. Paul-type pole cores can be also used as pole cores.

According to the present invention, as permanent magnets are held so that the permanent magnets do not protrude radially outward from the outer peripheral face of pole cores, the expansion of the air gap between the stator and the rotor can be prevented, thus avoiding degradation of the performance of rotating electric machines.

Moreover, as the metallic collision noise caused between the resin-made magnet holding member and permanent magnets can be suppressed, the generation of high-frequency impact magnetic noise can be prevented.

Furthermore, as the entire resin-made magnet holding member has elasticity, strains applied on the magnet holding member can be absorbed and relieved, thus avoiding the deformation and breakage of the magnet holding member and the permanent magnets. Also, the permanent magnets are stably held by the magnet holder.

This invention has been described in connection with what are presently considered to be the most practical and preferred embodiments. However, the present invention is not intended to be limited to the disclosed embodiments, but rather is intended to encompass all modifications and alternative arrangements included within the spirit and scope of the appended claims.

What is claimed is:

1. A rotor of a rotating electric machine comprising:

a shaft;

pole cores including a plurality of claw-like magnetic poles formed on an outer periphery thereof, said claw-like magnetic poles being constructed and arranged to engage with each other and rotate integrally with a rotation of said shaft;

a plurality of permanent magnets each of which is disposed between two circumferentially adjacent ones of said plurality of claw-like magnetic poles and each of which is magnetized in a direction that diminishes magnetic flux leakage between said circumferentially adjacent ones of said plurality of claw-like magnetic poles; and a non-magnetic magnet holding member for holding said plurality of permanent magnets, said magnet holding member including a plurality of axially-extending holding parts which contact and support said permanent magnets respectively thereon and a connecting part which passes circumferentially under said claw-like magnetic poles and connects said holding parts circumferentially into a ring shape, said connecting part having an axial length under said claw-like magnetic poles shorter than an axial length of said holding parts and connecting adjacent holding parts at an axial position where the adjacent holding parts are most closely adjacent.

2. A rotor according to claim 1, wherein said magnet holding member includes:

a plurality of encompassing parts which substantially completely encompass and hold each of said plurality of permanent magnets therein.

3. A rotor according to claim 1, wherein a part of each of said plurality of permanent magnets is exposed through said magnet holding member.

4. A rotor according to claim 1, wherein said magnet holding member is made of resin.

5. A rotor according to claim 1, wherein said plurality of claw-like magnetic poles are provided with flange parts extending circumferentially for suppressing a centrifugal movement of said magnet holding member.

6. A rotor according to claim 1, wherein:

said rotating electric machine is an alternating current generator; and said rotor has Lundell-type pole cores.

7. A rotor according to claim 1, wherein said magnet holding member is circumferentially discontinuous.

8. A rotor according to claim 1, wherein:

said connecting part is elastic to allow movement of said holding parts to fit in said pole cores.

9. A rotor according to claim 1, wherein:

said connecting part is disposed to expose radially inner sides of said claw-like magnetic poles at a position from which each of said claw-like magnetic poles extends axially.

10. A rotor of a rotating electric machine comprising:

a shaft;

pole cores including a plurality of claw-like magnetic poles formed on an outer periphery thereof, said claw-like magnetic poles being constructed and arranged to engage with each other and rotate integrally with a rotation of said shaft;

a plurality of permanent magnets each of which is disposed between two circumferentially adjacent ones of said plurality of claw-like magnetic poles and each of which is magnetized in a direction that diminishes magnetic flux leakage between said circumferentially adjacent ones of said plurality of claw-like magnetic poles; and a non-magnetic magnet holding member for holding said plurality of claw-like magnetic poles to hold said plurality of permanent magnets said magnet holding member including holding parts which contact and support said permanent magnets respectively thereon and a connecting part which passes circumferentially under said claw-like magnetic poles and connects said holding parts circumferentially into a ring shape, said connecting part being formed with axially concave portions, wherein said magnet holding member includes:

a plurality of base parts extending radially from said plurality of holding parts for suppressing axial movement of said plurality of permanent magnets; and a plurality of catching parts extending axially from said plurality of base parts, said plurality of catching parts suppressing a radial movement of said plurality of permanent magnets;

wherein said magnet holding member holds said plurality of permanent magnets such that opposed faces thereof facing circumferential side faces of said plurality of claw-like magnetic poles are exposed and said plurality of permanent magnets contact said plurality of claw-like magnetic poles.

11. A rotor for a rotating electric machine comprising:

a shaft;

a field coil;

pole cores supporting said field coil thereon and fixed to said shaft, said cores including a plurality of claw-like magnetic poles which are formed on an outer periphery thereof and extend axially in opposite directions to each other with spacings extending axially therebetween;

a plurality of permanent magnets disposed in said spacings; and a non-magnetic holding member formed integrally in a generally ring shape and including a plurality of first parts extending axially and a second part extending circumferentially and connecting said first parts circumferentially, said first parts being disposed in said spacings to support said permanent magnets in said spacings fixedly, and said second part having an axial length shorter than that of said first parts and connecting adjacent first parts at an axial position where the adjacent first parts are most closely adjacent.

12. A rotor according to claim 11, wherein said first part connects two adjacent axial side ends of said second parts and covers each axial end surface of said permanent magnets, and each of said second parts covers four axially extending side surfaces of each of said permanent magnets.

13. A rotor according to claim 11, wherein:

said second part is elastic to allow movement of said first parts to fit in said pole cores.

14. A rotor according to claim 11, wherein:

said second part is disposed to expose radially inner sides of said claw-like magnetic poles at a position from which each of said claw-like magnetic poles extends axially.

15. A rotor for a rotating electric machine comprising:

a shaft;

a field coil;

pole cores supporting said field coil thereon and fixed to said shaft, said cores including a plurality of claw-like magnetic poles which are formed on an outer periphery thereof and extend axially in opposite directions to each other with spacings extending axially therebetween;

a plurality of permanent magnets disposed in said spacings; and a non-magnetic holding member formed integrally in a generally ring shape and including a plurality of first parts extending axially and a second part extending circumferentially and connecting said first parts circumferentially, said first parts being disposed in said spacings to support said permanent magnets in said spacings fixedly, wherein said second part is formed in a ring shape and said first parts are formed to extend from said second part axially in opposite directions alternately in a circumferential direction.

16. A rotor according to claim 15, wherein each of said first parts includes:

a board part supporting each of said permanent magnets thereon;

a base part extending radially from an axial end of said board part to restrict an axial movement of each of said permanent magnets; and a catch part extending axially inwardly from a radial outer end of said base part to restrict a radial movement of each of said permanent magnets.

17. An alternator for a vehicle comprising:

a rotor rotatable by an engine and having a plurality of claw-like magnetic poles with spacing therebetween;

a stator disposed to face said claw-like magnetic poles;

a plurality of permanent magnets fitted in said spacings, respectively; and a magnet holder for connecting and holding said permanent magnets, said magnet holder having a plurality of holding parts holding said permanent magnets in contact therewith and connecting parts connecting said holding parts in generally a ring shape while allowing movement of said holding parts, so that said permanent magnets are fitted in said spacings in correspondence with a form of arrangement of said claw-like magnetic poles, said connecting parts connecting alternate axial ends of adjacent holding parts so that alternating axially concave portions are defined about a circumference of said magnet holder, thereby allowing said movement of said holding parts.

18. An alternator according to claim 17, therein:

said spacings are extended generally axially, inclined with respect to an axis of said rotor, thereby to form a zig-zag shape; and said connecting parts are set to allow relative turning movement among said holding parts.

19. A rotor for a rotating electric machine comprising:

a shaft;

a field coil;

pole cores supporting said field coil thereon and fixed to said shaft, said core including a plurality of claw-like magnetic poles which are formed on an outer periphery thereof and extend axially in opposite directions to each other with spacings extending axially therebetween;

a plurality of permanent magnets disposed in said spacings; and a non-magnetic holding member formed integrally in a generally ring shape and including a plurality of first parts extending axially and a second part extending circumferentially, said first parts being disposed in said spacings to support said permanent magnets in said spacings fixedly, and said second part having an axial length shorter than that of said first parts and connecting said first parts circumferentially at a first position including an axially central portion of said first parts while leaving said first parts disconnected at a second position axially adjacent to said axially central portion of said first parts.

20. A rotor according to claim 19, wherein adjacent first parts are inclined against said second part to form a V-shape, and said second position is provided only at one axial side of said central portion where a circumferential distance between said adjacent first parts is larger than that at said axially central portion of said first part.

21. A rotor according to claim 19, wherein said first position is provided only at said axially central portion of said first parts.

22. A rotor according to claim 19, wherein said second part is provided only at one position between adjacent first parts.

23. A rotor according to claim 19, wherein adjacent first parts are inclined against said second part to form a V-shape, said second position is provided at at least one axial side of said central portion of said first parts.

* * * * *

UNITED STATES PATENT AND TRADEMARK OFFICE
CERTIFICATE OF CORRRECTION

PATENT NO. : 5,793,144
DATED : August 11, 1998
INVENTOR(S) : Shin Kusase, et. al.

It is certified that error appears in the above-identified patent and that said Letters Patent is hereby corrected as shown below:

Title page, item [56], insert the following:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | 7 | 1 | 2 | 3 | 6 | 6 | 4 | 1995 | Japan | | | | |
| | | | | | | | | | | | | | |

Signed and Sealed this

Sixth Day of April, 1999

Attest:

Attesting Officer

Q. TODD DICKINSON

Acting Commissioner of Patents and Trademarks